United States Patent
Kruempelmann et al.

(10) Patent No.: US 11,113,253 B2
(45) Date of Patent: Sep. 7, 2021

(54) TEMPLATE-BASED SYNCHRONIZED CUSTOMIZATION DEPLOYMENT ON DATABASE SYSTEMS

(71) Applicant: SAP SE, Walldorf (DE)

(72) Inventors: Wulf Kruempelmann, Altlussheim (DE); Barbara Freund, Heidelberg (DE)

(73) Assignee: SAP SE, Walldorf (DE)

( * ) Notice: Subject to any disclaimer, the term of this patent is extended or adjusted under 35 U.S.C. 154(b) by 233 days.

(21) Appl. No.: 16/175,387

(22) Filed: Oct. 30, 2018

(65) Prior Publication Data

US 2020/0134057 A1    Apr. 30, 2020

(51) Int. Cl.
    *G06F 16/21*    (2019.01)
    *G06F 16/27*    (2019.01)

(52) U.S. Cl.
    CPC .......... *G06F 16/211* (2019.01); *G06F 16/27* (2019.01)

(58) Field of Classification Search
    None
    See application file for complete search history.

(56) References Cited

U.S. PATENT DOCUMENTS

| | | | |
|---|---|---|---|
| 6,240,422 B1 * | 5/2001 | Atkins | H04M 15/00 719/315 |
| 6,295,541 B1 * | 9/2001 | Bodnar | G06F 16/275 |
| 6,418,400 B1 * | 7/2002 | Webber | G06F 40/18 703/22 |
| 9,378,226 B1 * | 6/2016 | Wu | G06F 16/211 |
| 2003/0222903 A1 | 12/2003 | Herzog et al. | |
| 2003/0225741 A1 | 12/2003 | Herzog et al. | |
| 2007/0156714 A1 * | 7/2007 | Becker | G06Q 10/10 |
| 2008/0162509 A1 * | 7/2008 | Becker | G06F 16/2379 |
| 2008/0208898 A1 * | 8/2008 | Salo | G06F 9/4493 |
| 2011/0035417 A1 * | 2/2011 | Cohen | G06F 16/213 707/803 |
| 2011/0302133 A1 * | 12/2011 | Kuruganti | H04L 67/06 707/608 |
| 2011/0321025 A1 * | 12/2011 | Challa | G06F 9/44505 717/169 |
| 2012/0131154 A1 | 5/2012 | Kruempelmann et al. | |
| 2012/0191650 A1 * | 7/2012 | Ahmed | G06F 16/213 707/624 |
| 2012/0246110 A1 * | 9/2012 | Fischer | G06F 16/283 707/602 |

(Continued)

OTHER PUBLICATIONS

Christensson, P. Buffer Definition. Retrieved Sep. 14, 2020 from https://techterms.com. (Year: 2006).*

*Primary Examiner* — Irene Baker
(74) *Attorney, Agent, or Firm* — Klarquist Sparkman, LLP (57) ABSTRACT

Synchronized multi-system template provisioning is provided for networked computer systems, such as connected in a cloud environment. Each template includes information about corresponding templates and databases in other connected systems. When a template is deployed, user customization information is sent to the related systems to automatically deploy corresponding templates using the same or similar user customization information. Accordingly, when a template is deployed, the system checks for compatible templates in related systems and sends all information necessary for deploying the corresponding customizable templates in the other systems.

20 Claims, 4 Drawing Sheets

(56) References Cited

U.S. PATENT DOCUMENTS

2013/0191326 A1* 7/2013 Sharma .................. G06F 16/21
707/608
2019/0340216 A1* 11/2019 Dutta .................... G06F 16/258

* cited by examiner

SOFTWARE 580 IMPLEMENTING DESCRIBED TECHNOLOGIES

Figure 6

TEMPLATE-BASED SYNCHRONIZED CUSTOMIZATION DEPLOYMENT ON DATABASE SYSTEMS

BACKGROUND

Modern cloud systems include data clusters deployed on several related systems in a multi-system cloud landscape. The related systems deploy different software and database processes, while integrating data between the systems. For example, the related software and database processes may include Enterprise Resource Planning (ERP), Customer Relationship Management (CRM), Supplier Relationship Management (SRM), Supply Chain Management (SCM), Product Lifecycle Management (PLM), and other processes. Each process may include a disparate software system with a corresponding database for each system. The databases may include data related to the business, customers, suppliers, finances and other information. It is important for the data entries in the different databases to be consistent in the related systems. The data entries, however, are traditionally generated separately by manually configuring the entries in each system, leading the errors between the different systems. Further, because of the requirements of the different processes, corresponding data entries are often represented differently in the different systems, leading to further errors during configuration. Some systems include templates allowing customers to customize and adapt the templates for specific requirements of the processes, however corresponding templates must be manually deployed and customized in each of the related systems. As such, users must properly search for and select the correct corresponding templates in each system, then apply the same or similar customizations in each system in order for the data entries to match.

There exists ample opportunity for improving technologies related to deploying templates and user customizations in multiple, related systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for deploying synchronized templates in related systems, such as different systems within a connected cloud environment. For example, synchronized multi-system template provisioning is provided for in the different systems. Each template includes information about corresponding templates and databases for other connected systems. When a template is deployed, user customization information is sent to the related connected systems to automatically deploy a corresponding template in the related systems with corresponding user customizations. As such, when a template is deployed in a system, the system checks for compatible templates in other systems and sends all information necessary for deploying corresponding customized templates in the other connected systems.

DETAILED DESCRIPTION

Example 1—Overview

The following description is directed to technologies for deploying templates and user customizations in multiple, related systems. For example, the related systems may be provided to manage databases and tasks related to different software and database processes, such as Enterprise Resource Planning (ERP), Customer Relationship Management (CRM), Supplier Relationship Management (SRM), Supply Chain Management (SCM), Product Lifecycle Management (PLM), and other processes. Users may customize user settings and databases within each related system using customizable templates, and in response to deploying a customizable template in one system, related customizable templates are automatically deployed in the related systems by using equivalent or similar customization settings. Among other things, the user customization settings provide for consistent data representations in the related databases (i.e., definition of database fields).

Figure 1:
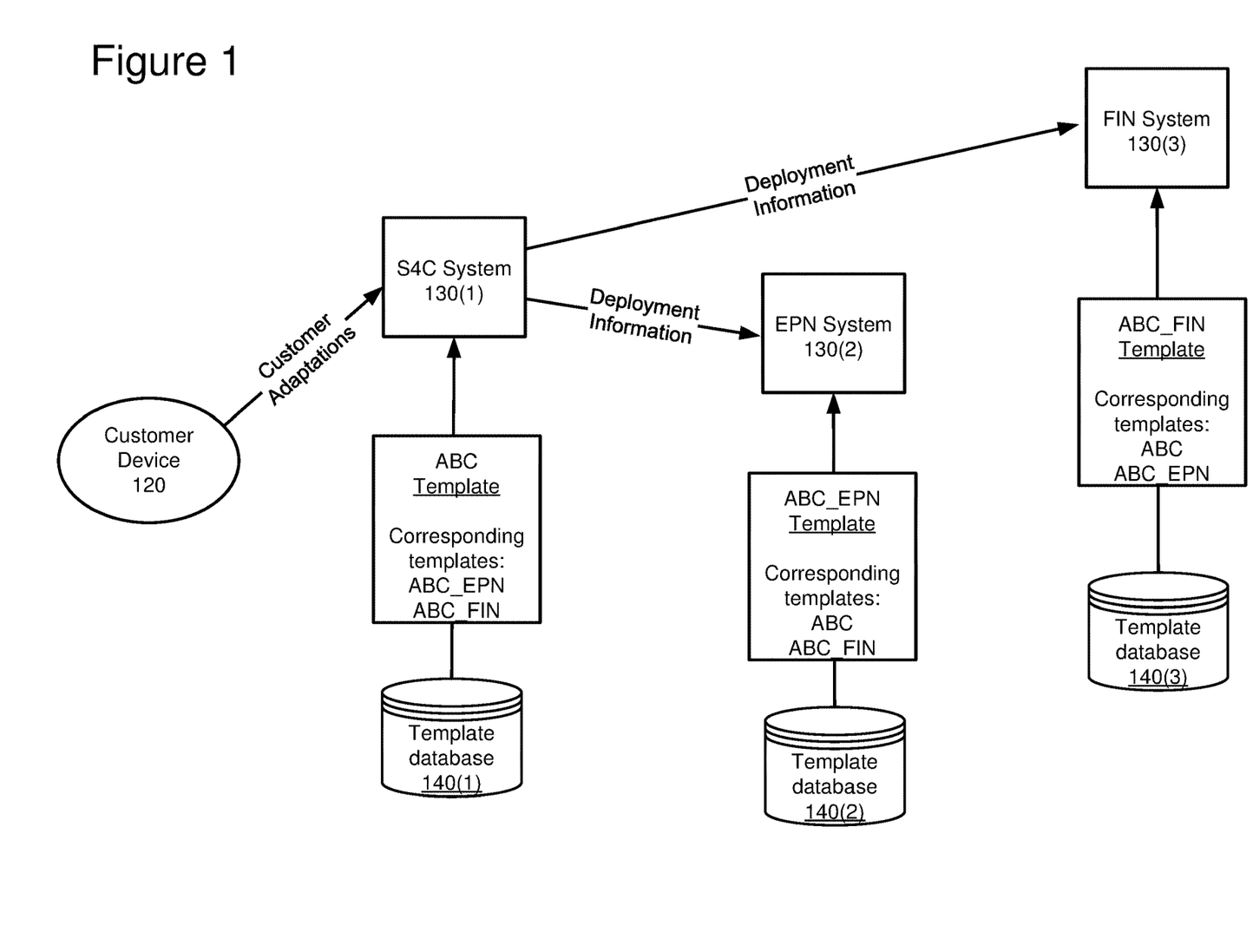
FIG. 1 is a diagram depicting an example of template-based synchronized deployments in connected computer systems.

FIG. 1 is a diagram depicting an example of template-based synchronized deployments in connected computer systems. In this example, three related systems, S4C 130(1), EPN 130(2) and FIN 130(3), are provided in a connected network environment, such as a cloud network or another network. In this example, S4C 130(1) represents an Enterprise Resource Planning (ERP) system, EPN 130(2) represents a Customer Relationship Management (CRM) system, and FIN 130(3) represents a financial system, such as a Collections Management (COL) system. Each system provides for different functionality and a corresponding database. As discussed above, other types of systems may be included, and the list provided herein is merely exemplary.

In a specific example, the system depicted in FIG. 1 may be adapted for an online retail seller of technical products. To do so, the systems are adapted to store overlapping business, customer and financial information and to provide the necessary functionality in each system. In this specific example, the S4C database stores predominantly business information, such as technical specifications of each of the online seller's products. The S4C system may incorporate customer preferences to the system, such as past purchases, but may omit other customer information, such as contact information and customer relationship information. The EPN system stores predominantly customer information, such as customer contact information, preferences and past purchases, but may omit other product information, such as technical specifications of the products. The S4C and EPN systems may omit some customer financial information, such as billing information unrelated to production information and customer relationship information. The FIN system stores predominantly financial information, including customer contact information and financial information, but may omit other customer and product information unrelated to keeping financial records and generating invoices. As such, the related systems include overlapping and corresponding business, customer and financial information.

Referring to FIG. 1, the S4C system 130(1) is provided with a local template database 140(1) and a business information database (not depicted). For example, the local template database 140(1) includes a local template ABC, which is customizable by a user, such as via customer adaptations provided by customer device 120. A user of the S4C system deploys template ABC and adapts the template to the user's specific processes.

The user may adapt the template by customizing the deployed template, such as by providing database settings and other technical settings that control the processes. In some embodiments, after selecting a local template, the user is presented with a list of adaptations available within the template. The selections are then used to adapt the template to the user's needs within the local system.

Referring back to the example of an online retail seller of technical products, the user may adapt the ABC template in the S4C system by selecting available client address fields and a format for the selected fields. Customizing the ABC template based on the selected fields and formats may be beneficial for the user because different industries, locations, countries and the like differ in the way that information is presented and stored. For example, addresses are presented differently in different countries, therefore templates may be adapted to provide the requisite data entries for the place of business of the user and/or the user's customers.

In this example, the user may deploy the ABC template with the following standardized or default address fields: name; family name; street address; postal code; city; and country. As an online retail seller of technical products, the user may adapt the ABC template for specific client address fields, such as: an email address; and accounting data fields. Further, accounting and other data fields may also be included and adapted, such as specific internal representations of bank account types and other related fields. Other business-related fields may also be included and adapted, such as business partner data fields, supplier address fields, and the like. In one example, the user may adapt the template for batch or serial manufacturing. In this example, if the user selects batch manufacturing, the user may define a batch numbering schema as a customer adaptation (e.g., charge001batch 001, b0001ofC0001, or another schema). Further, the user may define different types of material masters for the batch manufacturing (e.g., screwm_x_, plate_steel<length>x<width>x<thickness>). The user may also define additional information relevant to the batch manufacturing, such as recipes for products (e.g., a pharmaceutical or another product). Thus, the user adapts the template for specific use cases and requirements of the software and database processes.

Referring back to FIG. 1, after the ABC template is deployed in the S4C system 130(1), compatible templates are identified and automatically deployed in the related EPN and FIN systems 130(2), 130(3) to align the corresponding local templates ABC_EPN and ABC_FIN with the same or similar customizations as applied to the ABC template. For example, after the ABC template is deployed, information regarding the related EPN and FIN systems is determined. In this example, the ABC template includes references to the name of the corresponding ABC_EPN and ABC_FIN templates in the related EPN and FIN systems. The references to the corresponding templates may be stored in the ABC template itself, and/or may be stored in a buffer table together with the information of the source template and the customer adaptations. The buffer table may be provided as a high-level directory for the multiple related systems.

As depicted in the FIG. 1, the ABC template includes reference to corresponding templates ABC_EPN and ABC_FIN. Likewise, the ABC_EPN template includes reference to corresponding templates ABC and ABC_FIN. Additional information may be determined for the related systems, such as checking the version/revision number for each system, and whether there is a corresponding template in each system based on the version/revision number. In this example, the S4C system is an ERP system (e.g., SAP® cloud ERP release 1905), which checks the version of the related systems, such as the EPN system (e.g., SAP® CRM release 1902). The version of the different systems may indicate whether a template exists and should be automatically deployed as templates may differ between versions. In some instances, a corresponding template may not be available for the version of the related systems.

During the definition of each template, information is stored about which templates correspond between systems and what system types are connected to each template. Referring back to the example of a template adapted for batch manufacturing, the template includes settings specific to batch manufacturing as opposed to serial manufacturing. The batch specific settings may be stored in files containing the settings, such as XML files or other file types.

For example, ERP system templates and CRM system templates each have some equivalent information, however the information may be represented differently in each system. When the templates are deployed, the customer adaptations received from the user are incorporated into the respective templates based on system related keys. The system keys internal to each template represent how database fields from the different systems correspond with each other and store the same information. The system keys may be stored as data in customizing tables for each system and/or each template. For example, the customizing table for the ABC template may include that the ABC template corresponds to templates ABC_EPN and ABC_FIN, and includes information on type of system fields included in the template and how the fields correspond fields of templates from other corresponding systems (e.g., in meta language or in another language or representation).

Based on the customizing table, after deploying a template, information about the corresponding systems is read from the table. If there are corresponding templates, information is sent to the corresponding system for deploying the corresponding templates in the connected systems. The information sent to corresponding systems may include: the name of the original template; the name of the corresponding template; and the information about customer adaptations. Additional and different information may also be sent. For example, in addition to the name of the templates in both systems and the customer adaptation settings, customer adaptation settings for other related templates may also be sent.

Referring back to FIG. 1, when the ABC template is deployed, the S4C system reads information about the corresponding EPN and FIN systems, and sends deployment information to each system. In this example, the ABC template name, the ABC_EPN template name and customization information is sent to the EPN system. Likewise, the ABC template name, the ABC_FIN template name and customization information is also sent to the FIN system.

In some embodiments, the deployment information is transmitted between systems using transport requests. The transport requests include a collection of changes from the unmodified default template. The changes represented in the transport requests may be presented to the corresponding systems as proposed changes to the local corresponding template, which may be accepted or rejected, and may be used in deploying corresponding template.

In some embodiments, customizations in all systems are recorded in the transport requests and recorded in a buffer table of a high-level directory for the multiple, related systems. Further, as these transport requests are transmitted, the export and the import of the transport requests are stored in the buffer table in order to track whether data exported from one system reaches the target systems, providing for consistent information and processes across all systems.

Referring back to FIG. 1, after information is transmitted to the corresponding systems, each system checks for a corresponding template in its local template database. For example, the target EPN system checks if the corresponding ABC_EPN template is ready to deploy. If the corresponding template exists in the local database, the customer adaptations are automatically mapped within the corresponding template, such as when the ABC_EPN template is deployed. Key mapping and structure mapping need not be performed by a separate mapping engine in conjunction with deploying the corresponding templates.

For example, key mapping by a mapping engine determines how database fields within each of the corresponding systems relate to each other to represent the same information. For example, each system has a table of key fields and information how fields may be used with other systems (e.g., in meta language, in another language, via an algorithm or in another representation). As such, key fields are mapped in each system using a key mapping table. In conjunction with key mapping, structure mapping may also be performed by the mapping engine. Structure mapping determines how the structure of the data fields differ from each other, and provides logic for adapting data between databases. By using templates in the corresponding systems as discussed above, key mapping and structure mapping need not be performed by a separate mapping engine. Instead of key mapping and structure mapping between databases, the templates include internal mappings for deploying the corresponding templates with the received customer adaptations. As such, no mapping engine is utilized when the corresponding templates are deployed.

For example, information mapping between the corresponding templates may be provided internally within the deployed templates. In this example, each system-type specific template contains the information for deploying the template with the customer adaptations, including how data is stored within the specific system. The customer adaptations are provided as meta data and may be automatically included into the system during deployment of the system and the system templates. For example, a customer adaptation may be a new bank account type (e.g., online banking, such as PayPal®). In a CRM system, the new bank account type adaptation is represented by a flag for the account together with a naming convention. In ERP financial systems, this new bank account type is represented with additional information on money transfer methods and new coding. Accordingly, the customer adaptation is provided as the account name and the transfer accounts. Thus, in the CRM system, the new bank account type is deployed with the account name and the type via table within the template data, and the corresponding template is deployed in the ERP system using all data for the new bank account type. In this embodiment, no key or structure mapping is used, as the templates are deployed with the customer adaptations and the correct data structures based on the templates themselves using transmitted meta data.

By way of example, a street name and number may be provided as a single data field in the S4C database (i.e., such as the street number and street name separated by a space). However, in the EPN system, the street name and number are provided in two different fields in its database (i.e. a first field with the street number and a second field with the street name). The mappings internal to each template provides for mapping the data fields between the two different systems, and stores this information in the mapping table. Further, the internal mapping provides for logic to map key fields from one system to another. For example, the internal mapping from the EPN system to the S4C system provides logic for concatenating the two fields from the EPN system into one field for the S4C database. Likewise, internally mapping from the S4C system to the EPN system provides logic for identifying spaces in the address field to separate the street name from the street number into two separate fields.

By way of another example, a new bank account type for PayPal® may be provided in a financial system (FIN) and a shipping system (SHIP). A PayPal® template is provided in each system, as PAYP_FIN and PAYP_SHIP, respectively. The PAYP_FIN template includes the following fields: Account Name; User First Name; User Family Name; User Email Address; and Corresponding Bank Account. The PAYP_SHIP template includes the following fields: Account Name; User Family Name; User First Name; User Email Address; and User Address. During provisioning of the PAYP_FIN template in the FIN system, the following information is provided to the FIN system: Account Name; User Email Address; and User Information (e.g., name, bank account and address details, stored in the address master database). The PAYP_FIN template then utilizes a subset of the information to deploy the template and to incorporate the information in a database table of the FIN system. The PAYP_SHIP template in the SHIP system is then deployed based on receiving information from the FIN system. The SHIP system receives all the data input by the user, and deploys the PAYP_SHIP template with only the required data fields used by the template. Based on the internal mappings in each of the PAYP_FIN and PAYP_SHIP, the requisite database fields are provided in each of the FIN and SHIP systems, and no external mapping or mapping engine is required.

As discussed above, deployment records for the templates are stored into a buffer table, together with the information of the source template and the customer adaptations. The buffer table may be provided in a high-level or overall directory for the related systems, along with other information for each system, such as the database processes for each system. If a corresponding template is not ready for deployment in one or more of the target systems, a record/flag is also stored in the buffer table indicating that a corresponding template may be deployed at a later date. For example, if a system is updated/upgraded, the high-level system checks for new, not yet deployed templates and automatically deploys the new templates with the stored customer adaptations to the corresponding system.

Further, when the high-level system checks for missing templates, the high-level system may query a development system for updates to new templates to be deployed, or modifications to existing templates to be updated. The development system provides the original template name, while the target system receives the template name stored in the local database for deployment in the system. For example, if a software vendor creates a new type of bank account type (e.g., PayPal®, as discussed above) as a new account type and a new method to transfer money, the new account type is delivered together with the required software code to the target systems. As such, the templates are delivered to each system in their specific format. The name of the account type as deployed is a customer adaptation, as well as the transfer method to the other account types.

Figure 2:
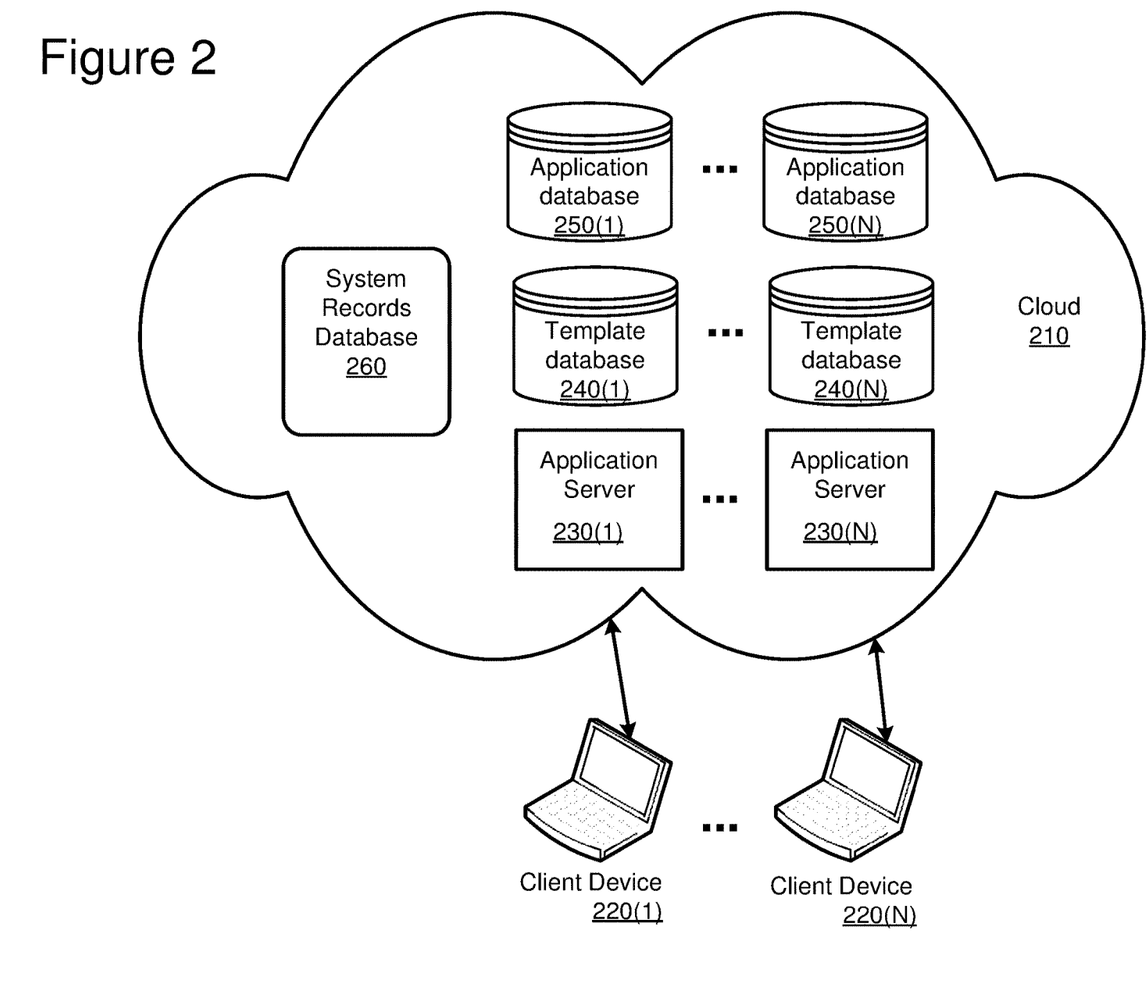
FIG. 2 is a diagram depicting an example cloud-based server environment for deploying synchronized templates in connected systems.

Example 2—Cloud Environments Supporting Template Based Synchronized Customization Deployment on Multiple Systems FIG. 2 is a diagram depicting an example cloud-based server environment 210 for deploying synchronized templates in connected systems. The cloud-based server environment includes server platforms for running multiple, related software systems. As discussed above, the related systems may each have a different business process, such as Enterprise Resource Planning (ERP), Customer Relationship Management (CRM), Supplier Relationship Management (SRM), Supply Chain Management (SCM), Product Lifecycle Management (PLM), and other processes.

A number (N) of application servers 230(1) to 230(N) are provided in the cloud-based server environment 210. One or more of the related software systems are executed on the application servers 230(1) to 230(N). For example, a first computer application server 230(1) runs a first customizable software platform, such as an ERP system. A second computer application server 230(N) runs a second customizable software platform and a third customizable software platform, such as a CRM system and an SRM system. Additional or different software systems may run on one or more of the application servers 230(1) to 230(N).

A number (N) of template databases 240(1) to 240(N) and a number (N) of application databases 250(1) to 250(N) are provided for each of the application servers 230(1) to 230(N). To interact with the software systems running on the application servers 230(1) to 230(N), a number (N) of client devices 220(1) to 220(N) are provided to accept user inputs and to display relevant information to users. As will be discussed below, a system records database 260 is provided to store high-level information relevant to the related software systems running on the application servers 230(1) to 230(N).

The cloud-based server environment 210 is configured to perform operations for a template-based synchronized deployment in the related software systems running on application servers 230(1) to 230(N). For example, a first template from template database 240(1) is instantiated on the application server 230(1). The first template may be deployed or instantiated in response to a request from a client device 220(1). The first template is provided for customizing the first customizable software platform, such as for adapting additional data entries for the application database 250(1) in the ERP system.

Further, in response to a user input from client device 220(1), the first template is customized. As discussed above, the template may be customized by receiving definitions of database fields for the application database 250(1). In some embodiments, the first template is customized by the user selecting from a list of available customizations presented to the user on client device 220(1).

The cloud-based server environment 210 is configured to perform operations to automatically instantiate and customize corresponding templates in related software systems. For example, after the first template is instantiated and customized on the first application server 230(1), corresponding templates are instantiated in related systems, such as by instantiating a second template for a second customizable software platform running on application server 230(N), such as the CRM system.

Concurrently with or after instantiating the corresponding template(s) in the related system(s), the corresponding template(s) are customized with the same or similar customer adaptations as the first template. For example, a second template running on application server 230(N) is customized with the same adaptations received from the client device 220(1). As discussed above, customizing the second template need not utilize key mapping and/or structure mapping by a mapping engine using the information provided from the first application server 230(1), such as the name of the first template, the name of the second template and additional information about the customer adaptations. Instead of using a mapping engine, each template includes an internal mapping for use when the template is deployed, adapting the corresponding system with the received customer adaptations.

For example, key field definitions for the first application database 250(1) are provided within the templates stored in first template database 240(1), and corresponding key field definitions for the second database 250(N) are provided within the templates stored in the corresponding second template database 240(N). In some embodiments, the internal mappings are different between template databases to account for differences in data fields between application databases, such as when fields in the first application database 250(1) are represented differently in the second application database 250(N). In the example discussed above, street name and street number fields in the first application database 250(1) may be defined as a single data entry, while the corresponding street name and street number in the second application database 250(N) may be defined as a single data field. The internal template mappings for each system allow for the same customer adaptations to be used to customize the corresponding templates.

In some embodiments, after initially instantiating and customizing corresponding templates across the connected systems, later updates and customizations to the templates are synchronized across the corresponding systems to account for the additional customer adaptations to one or more of the templates. For example, after the second template is automatically instantiated on application server 230(N) based on the customer adaptations received from the first client device 220(1), another user on a second client device 220(N) may provide additional customer adaptations in order to customize the second template and the application database 250(N). The additional customer adaptations are provided from the second application server 230(N) to the first application server 230(1) for use in the first template and application database 250(1). Likewise, additional customer adaptations received from the first client device 220(1) may be provided to the second application server 230(N) for use in the second template and application database 250(N).

The system records database 260 is provided to store high-level information relevant to the multiple related software systems running on the application servers 230(1) to 230(N). Information regarding instantiation of all templates and all related customer adaptations are in the system records database 260, such as stored in a buffer table. The System records database 260 also stores information about all of the related systems, such as the business processes controlled by each system.

Figure 3:
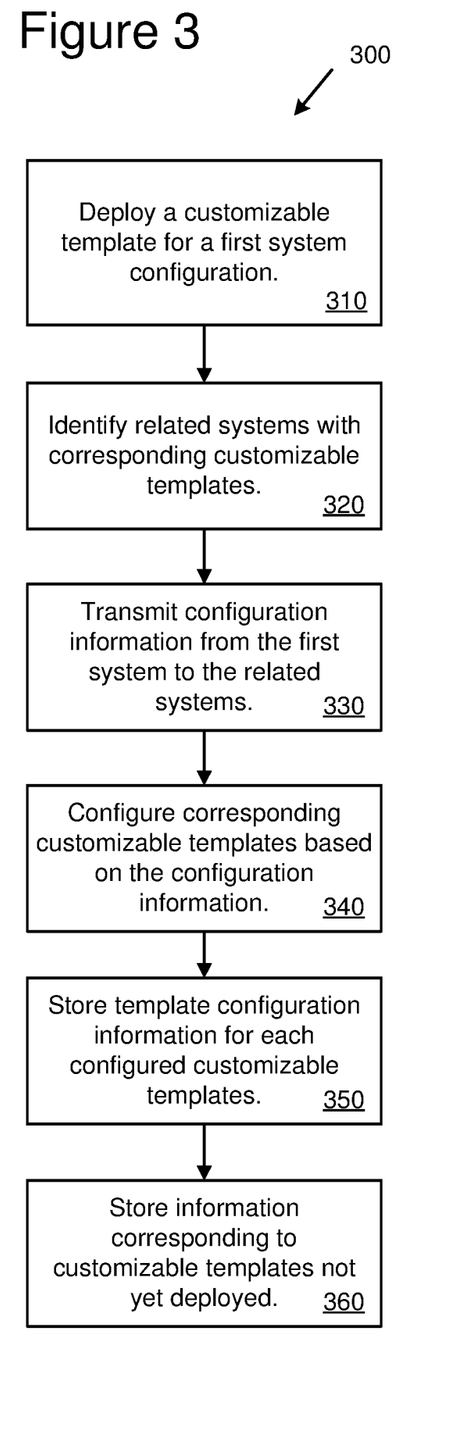
FIG. 3 is a flowchart of an example method for template-based synchronized deployment in multiple computer systems.

Example 3—Methods Supporting Template Based Synchronized Customization Deployment on Multiple Systems FIG. 3 is a flowchart of an example method 300 for template-based synchronized deployment in multiple database systems. The method 300 can be implemented by any of the systems of FIGS. 1, 2, 5, 6 and/or a different system. Additional, different or fewer acts may be provided. For example, various acts may be omitted or performed by a separate system. Although the method is presented in the illustrated order, other orders may be provided and/or acts may be repeated, such as repeating various acts 310-360 to deploy and customize addition templates in various systems.

At 310, a customizable template is deployed for a first system configuration. The first system configuration is provided for a first set of database processes. At 320, related systems with corresponding customizable templates identified and pertinent information is gathered regarding the deployed template and corresponding templates in the related systems. For example, relationships between the customizable templates between systems are recorded and stored, such as relationships between database entries for the same or similar information stored in each system.

The customizable template may be customized with configuration information before, during or after the template is deployed. For example, customizing the template during deployment may include receiving a request to deploy the customizable template, such as from a user device. Configuration information may also be received from the user device with or in addition to the request, and based on the request and the configuration information, the customizable template is deployed.

At 330, configuration information is transmitted from the first system to the identified related systems. For example, the configuration information includes the name of the deployed template for customizing the first system configuration, the name of corresponding templates in related systems and customer adaptation information used to customize the deployed template. Further, based on the recorded relationships between systems, relationships between database entries, and the data itself, are transmitted between the first system and the related systems that were identified.

At 340, the corresponding customizable templates are deployed and configured based on the transmitted configuration information. Configuring the corresponding customizable templates may include internally mapping the transmitted configuration information for the corresponding customizable templates. For example, the internal template mappings are used to identify related data entries across different databases.

At 360, template configuration information are stored for each configured customizable templates, such as in a buffer table in a high-level system with information about the related systems. For example, the template configuration information stored may include the name of the template for customizing the first system configuration, the name of a corresponding template and any user adaptation information for the deployed templates. In some cases, no corresponding database fields or templates exist in connected systems, which is recorded in the high-level system for use later if corresponding database fields or templates are created or deployed in the connected systems. For example, at 370, a system is identified as being without a corresponding customizable template, and an identifier is stored for the related system indicating that the corresponding customizable template is not yet configured. When a template becomes available, the high-level system automatically deploys the new template based on the stored identifier.

Figure 4:
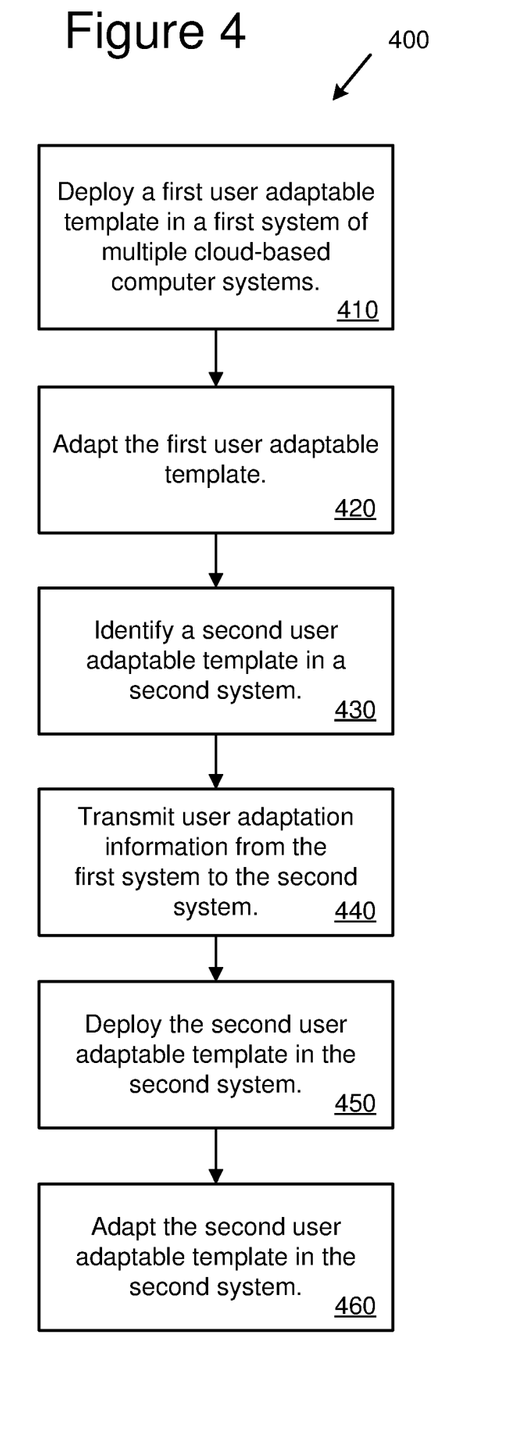
FIG. 4 is a flowchart of an example method for template-based synchronized deployment in connected, cloud-based computer systems.

FIG. 4 is a flowchart of an example method 400 for template-based synchronized deployment in a connected cloud-based computer system. The method 400 can be implemented by any of the systems of FIGS. 1, 2, 5, 6 and/or a different system. Additional, different or fewer acts may be provided. For example, various acts may be omitted or performed by a separate system. Although the method is presented in the illustrated order, other orders may be provided and/or acts may be repeated, such as repeating various acts 410-460 to deploy and customize addition templates in various systems.

At 410, based on a user request, a first user adaptable template is deployed in a first computer system within a cloud-based computer system. At 420, based on user inputs, the first user adaptable template is adapted for the needs of the user in the first computer system. In some implementations, adapting the user adaptable templates includes selecting data fields and data formats within the templates according to the user inputs.

At 430, based on adapting the first user adaptable template, a second user adaptable template is identified in a second system within the cloud-based computer system. In some implementations, identifying a second user adaptable template in a second system of the cloud-based computer systems comprises checking version numbers each system.

At 440, user adaptation information is transmitted from the first system to the second system. At 450, based on transmitting the user adaptation information, the second user adaptable template is deployed in the second system. In some implementations, transmitting user adaptation information from the first system to the second system includes transmitting a transport request to a common buffer table for the first and second systems, and deploying the second user adaptable template in the second system comprises automatically deploying the second user adaptable template based on the transport request stored in the common buffer table.

At 460, based on the transmitted user adaptation information, the second user adaptable template is adapted based on the adaptations to the first computer system.

Example 4—Computing Systems

Figure 5:
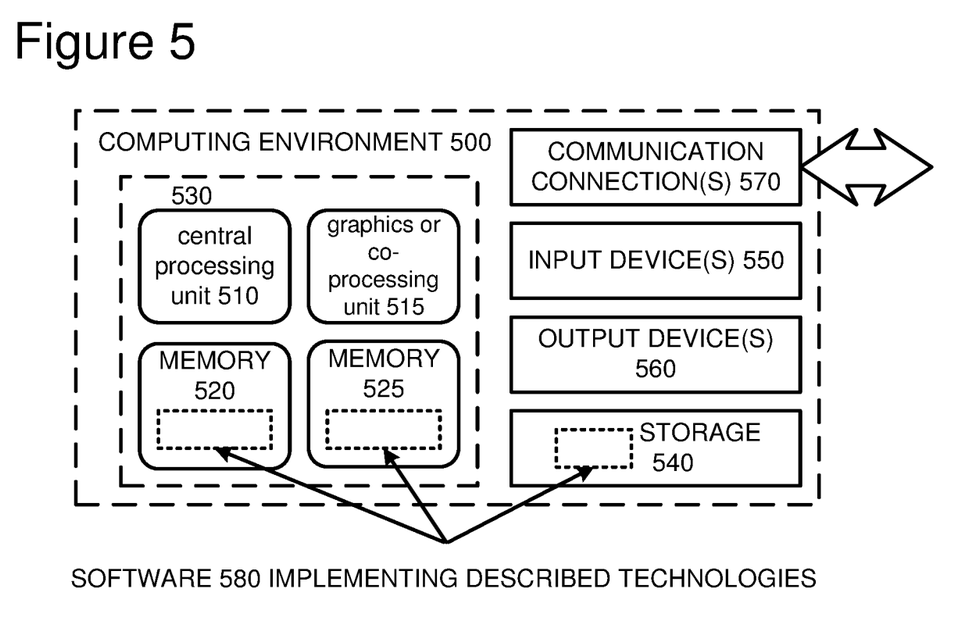
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 500, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions and/or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 5—Cloud Computing Environment

Figure 6:
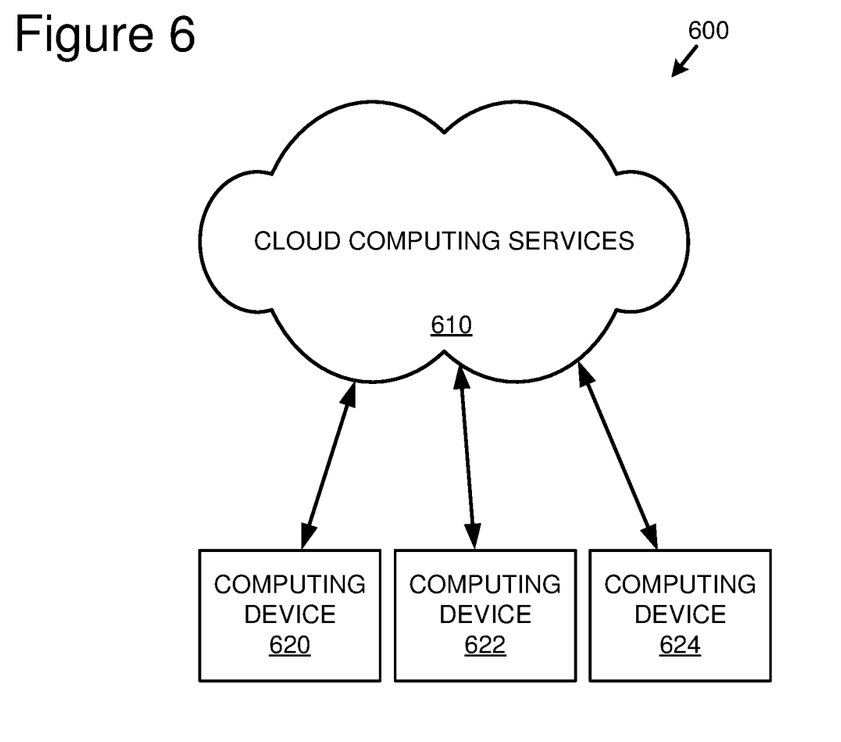
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example 6—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections (e.g., 570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method for template-based synchronized deployment in multiple database systems, the method comprising:
    deploying a first customizable template for a first system, the first customizable template defining database fields for receiving data in a database of the first system, wherein deploying the first customizable template comprises:
        receiving, from a user device, a request to deploy the first customizable template for the first system;
        receiving, from the user device, configuration information for the first customizable template for the first system; and
        customizing, based on the received configuration information, the first customizable template for the first system; and
    after the first customizable template is deployed, automatically identifying and deploying one or more compatible templates in at least one connected system, wherein the identifying and deploying comprises:
    identifying a second, corresponding customizable template of the at least one connected system corresponding to the first customizable template, wherein the at least one connected system comprises equivalent information of the first system but represents the equivalent information differently from the first system, wherein fields in the first system are represented differently in the at least one connected system, wherein differently represented comprises representing a single data field as a plurality of data fields;
    transmitting the configuration information from the first system to the identified connected system; and
    configuring the second, corresponding customizable template based on the transmitted configuration information, the second, corresponding customizable template defining different database fields for receiving data in related databases of the identified connected system, wherein configuring the second, corresponding customizable template comprises aligning the second, corresponding customizable template with a same or similar customization as applied to the first customizable template and a mapping accounts for the differently represented fields.

2. The method of claim 1, wherein configuring the second, corresponding customizable template comprises mapping the transmitted configuration information to the second, corresponding customizable template,
    wherein the second, corresponding customizable template defines which database fields in the first system correspond with database fields in the connected system.

3. The method of claim 1, wherein configuring the second, corresponding customizable template comprises mapping the transmitted configuration information to the second, corresponding customizable template,
    wherein an internal mapping defined in the second, corresponding customizable template defines how configurations of database fields in the first system are mapped with different configurations of corresponding database fields in the connected system.

4. The method of claim 1, wherein configuring the second, corresponding customizable template comprises internally mapping the transmitted configuration information to the second, corresponding customizable template for connected system with different database configurations.

5. The method of claim 1, wherein the transmitted configuration information comprises a name of the first customizable template, a name of the second, corresponding customizable template and customization information for the first system.

6. The method of claim 1, further comprising:
    recording relationships between the first customizable template in the first system and the second, corresponding customizable template in the connected system; and
    transmitting, based on the recorded relationships, data between the first system and the connected system.

7. The method of claim 1, further comprising:
    storing, in a buffer table, template configuration information for each configured customizable template,
    wherein the template configuration information comprises a name of the first, customizable template, a name of the second, corresponding template and adaptation information.

8. The method of claim 1, further comprising:
    identifying a related system without a corresponding customizable template; and storing an identifier for the related system indicating that the corresponding customizable template is not yet configured.

9. A cloud-based server environment comprising:
a first computer server running a first customizable software platform; and
a second computer server running a second customizable software platform,
wherein the server environment is configured to perform operations for a template-based synchronized deployment with the first computer server and the second computer server, the operations comprising:
instantiating, on the first computer server, a first template for customizing the first customizable software platform;
receiving, in response to a user input, a customization of the first template comprising user adaptations;
instantiating, in response to instantiating the first template, a second template for customizing the second customizable software platform, wherein the instantiating comprises identifying the second template as being for the second customizable software platform and corresponding to the first template and sending a name of the first template, a name of the second template, and information about the user adaptations to the second customizable software platform; and
customizing, based on receiving the customization of the first template, the second template, wherein the customizing is based on the information about the user adaptations;
wherein the second customizable software platform comprises equivalent information from the first customizable software platform, but represents the equivalent information differently;
wherein representing information differently comprises representing data in a single field across a plurality of fields.

10. The server environment of claim 9, wherein receiving the customization of the first template comprises receiving selections from a list of available customizations presented to a user.

11. The server environment of claim 9, wherein the server environment includes further operations comprising:
synchronizing later updates and customizations to account for additional user adaptations, wherein the synchronizing comprises:
updating, in response to an additional user input, the first template with an additional customization corresponding with a customization in the second template.

12. The server environment of claim 9, further comprising:
a third computer server running a third customizable software platform,
wherein the server environment is configured to perform further operations comprising:
receiving, in response to instantiating the first template, a command to instantiate a third template for customizing the third customizable software platform;
checking, in response to receiving the command, for the third template in the third customizable software platform;
generating, based on checking for the third template, a record indicating that the third template is not ready for instantiation;
updating the third customizable software platform;
checking, based on the record and in response to updating the third customizable software platform, for the third template in the updated third customizable software platform;
instantiating, in response to checking for the third template in the updated third customizable software platform, the third template for customizing the updated third customizable software platform; and
customizing, based on receiving the customization of the first template, the instantiated third template.

13. The server environment of claim 9, wherein receiving the customization of the first template comprises receiving a definition of a first database field, and
wherein customizing the second template comprises internally mapping the definition of the first database field to at least one corresponding second database field in the second template.

14. The server environment of claim 13, wherein the definition of the first database field in the first template is represented differently in the second database field in the second template.

15. The server environment of claim 13, wherein the definition of the first database field in the first template is represented by a plurality of second database fields in the second template.

16. A method for template-based synchronized deployment in connected, cloud-based computer systems, the method comprising:
deploying, based on a user request, a first user adaptable template in a first system of the cloud-based computer systems, the first user adaptable template defining data fields for receiving data in the first system;
adapting, based on user inputs, the first user adaptable template;
identifying, based on adapting the first user adaptable template, a corresponding, second user adaptable template in a second system of the cloud-based computer systems, wherein the first system comprises a system type different from the second system, the first user adaptable template is a system-type-specific template for the first system, and the corresponding, second user adaptable template is a system-type-specific template for the second system;
transmitting user adaptation information from the first system to the second system;
deploying, based on transmitting the user adaptation information, the corresponding, second user adaptable template in the second system, the corresponding, second user adaptable template defining different data fields for receiving data in the second system, wherein the deploying comprises applying logic for adapting data between related databases; and
adapting, based on the transmitted user adaptation information, the corresponding, second user adaptable template.

17. The method of claim 16, wherein adapting the first user adaptable template comprises:
selecting, based on the user inputs, data fields to be activated within the first user adaptable template; and
selecting, based on the user inputs, data formats for the selected data fields within the first user adaptable template.

18. The method of claim 16, wherein identifying a second user adaptable template in a second system of the cloud-based computer systems comprises checking version numbers each system.

19. The method of claim 16, wherein transmitting user adaptation information from the first system to the second system comprises transmitting a transport request to a common buffer table for the first and second systems.

20. The method of claim 19, wherein deploying the corresponding, second user adaptable template in the second system comprises automatically deploying the corresponding, second user adaptable template based on the transport request stored in the common buffer table.

* * * * *